(12) United States Patent
Bobert et al.

(10) Patent No.: US 9,356,441 B2
(45) Date of Patent: May 31, 2016

(54) STACKED GAS FILLED SURGE ARRESTER

(71) Applicant: EPCOS AG, München (DE)

(72) Inventors: Peter Bobert, Falkensee (DE); Frank Werner, Berlin (DE)

(73) Assignee: EPCOS AG, München (DE)

( * ) Notice: Subject to any disclaimer, the term of this patent is extended or adjusted under 35 U.S.C. 154(b) by 132 days.

(21) Appl. No.: 14/346,305

(22) PCT Filed: Sep. 17, 2012

(86) PCT No.: PCT/EP2012/068246
§ 371 (c)(1),
(2) Date: Mar. 20, 2014

(87) PCT Pub. No.: WO2013/041486
PCT Pub. Date: Mar. 28, 2013

(65) Prior Publication Data
US 2014/0218836 A1    Aug. 7, 2014

(30) Foreign Application Priority Data
Sep. 23, 2011   (EP) ..................... 11182549

(51) Int. Cl.
| H01C 7/12 | (2006.01) |
| --- | --- |
| H02H 1/00 | (2006.01) |
| H02H 1/04 | (2006.01) |
| H02H 3/22 | (2006.01) |
| H02H 9/00 | (2006.01) |
| H01T 4/06 | (2006.01) |
| H01T 4/20 | (2006.01) |

(52) U.S. Cl.
CPC .............. *H02H 9/005* (2013.01); *H01T 4/06* (2013.01); *H01T 4/20* (2013.01)

(58) Field of Classification Search
CPC ................................ H02H 9/04; H02H 9/041
USPC ........................................................ 361/118
See application file for complete search history.

(56) References Cited

U.S. PATENT DOCUMENTS 4,760,485 A * 7/1988 Ari ................. H02H 9/04
338/333

FOREIGN PATENT DOCUMENTS

| CN | 1040108 A | 2/1990 |
| --- | --- | --- |
| CN | 1294745 A | 5/2001 |
| CN | 20132120 | 9/2009 |
| DE | 102008050539 A1 | 4/2010 |
| FR | 2687246 A1 | 8/1993 |

* cited by examiner

*Primary Examiner* — Dharti Patel
(74) *Attorney, Agent, or Firm* — McDermott Will & Emery LLP

(57) ABSTRACT

A surge arrester comprising stacked arrester units is provided that is that is easy to assemble. For that, a surge arrester comprises stacked arrester units, a capacitor, and a resilient element, where the resilient element electrically and mechanically connects the capacitor with a node of the arrester stack.

10 Claims, 5 Drawing Sheets

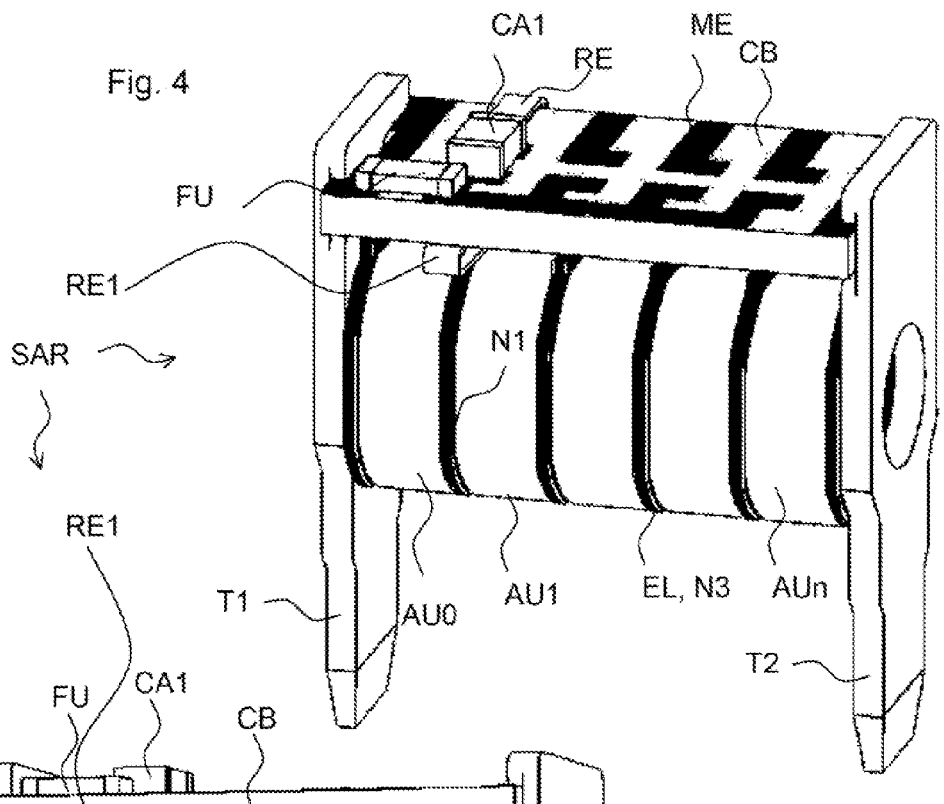
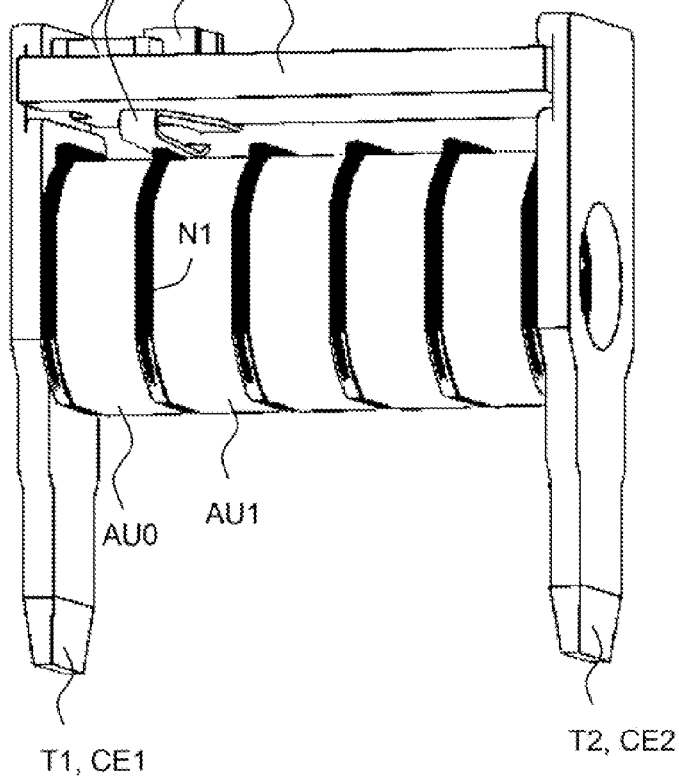

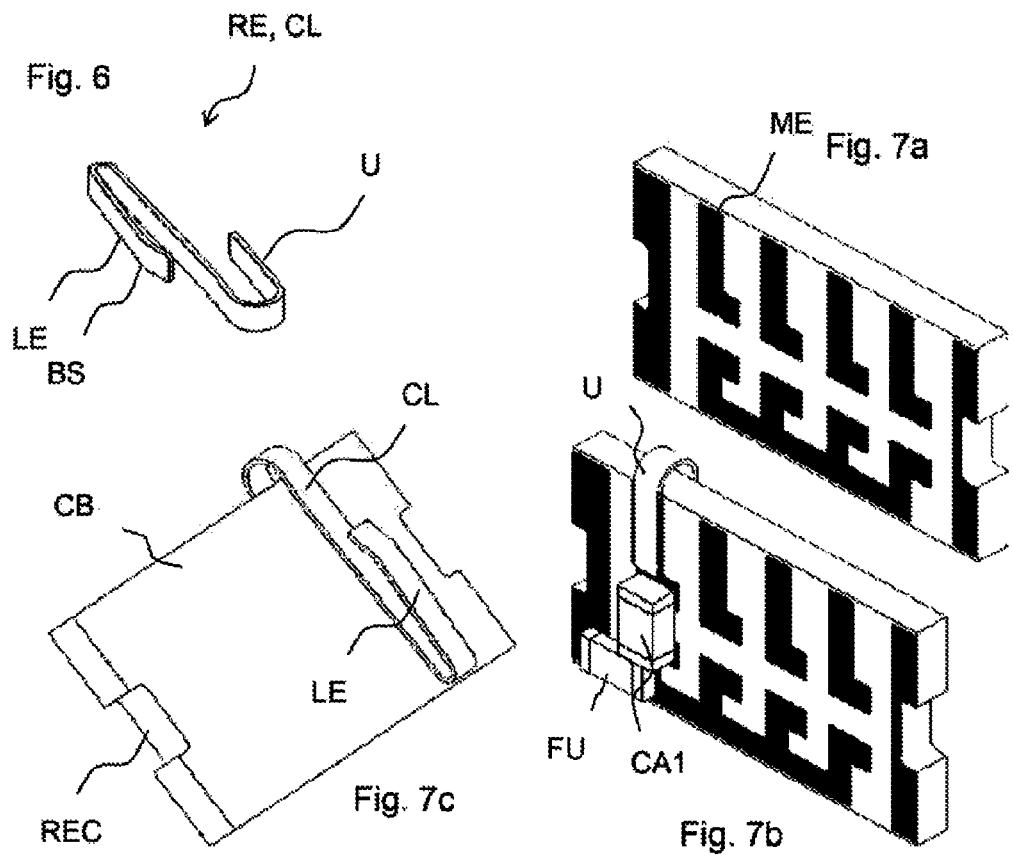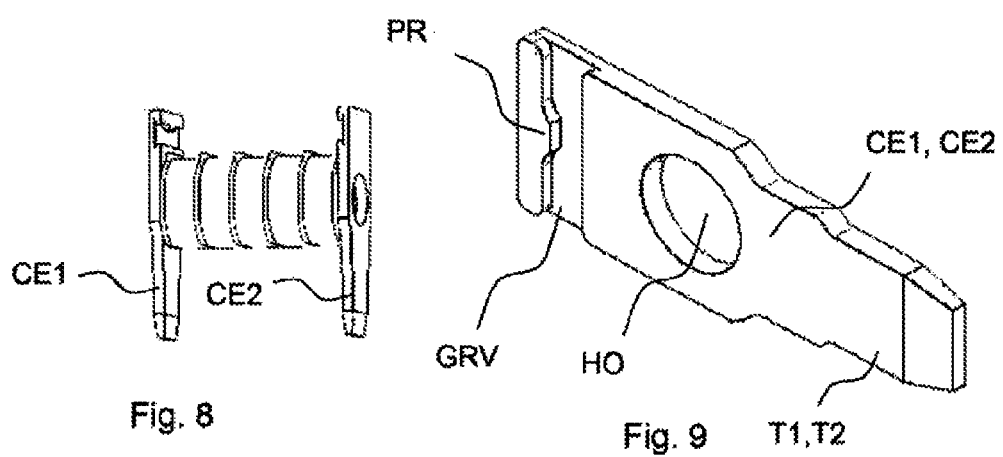

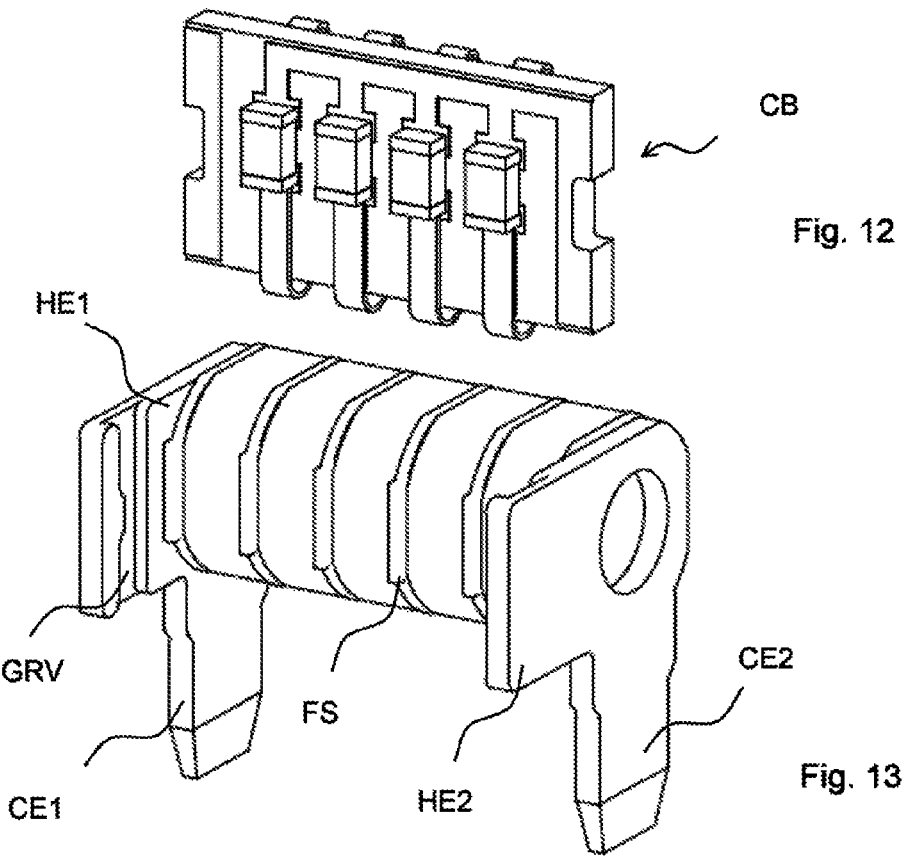
Fig. 12
Fig. 13
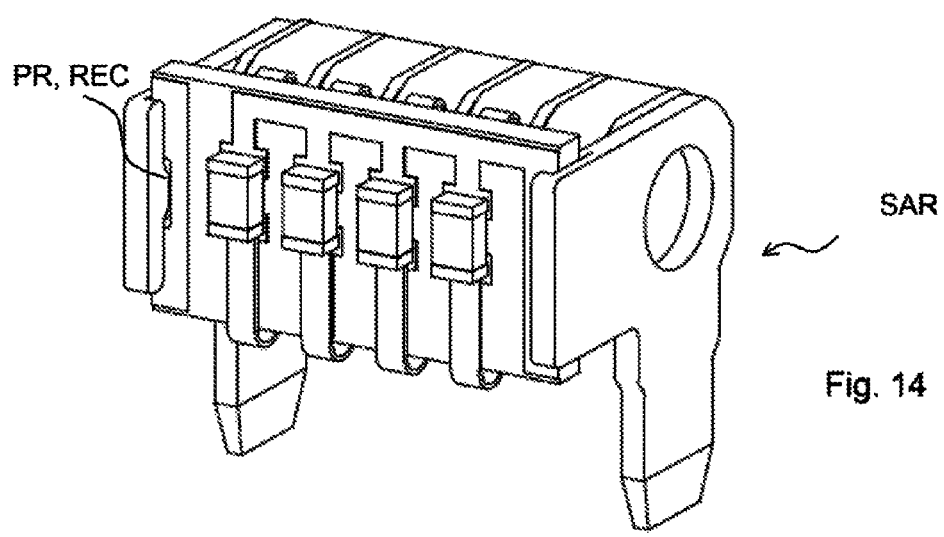
Fig. 14

STACKED GAS FILLED SURGE ARRESTER

The present invention relates to surge arresters comprising stacked gas filled arrester units.

Surge arresters can be used in electrical components to protect sensitive component circuits from voltage or current surges—e.g. of a nearby lightning stroke—or other unwanted discharges.

Stacked gas filled surge arresters usually comprise arrester units being filled with gases e.g. such as noble gases. When a voltage is applied to such an arrester unit that exceeds a specific spark-over voltage, then the resistivity of the arrester unit decreases and the arrester unit becomes conducting. In other words: the arrester unit is activated. When the voltage applied to the arrester unit falls below a specific arc voltage, then the resistivity again increases and the arrester unit becomes isolating again; the arrester unit is de-activated.

Surge arresters usually connect sensitive circuits to ground. However, if the voltage level of the sensitive circuit relative to the ground potential after activating the arrester unit exceeds the arc voltage of the arrester unit, then the resistivity of the arrester unit cannot increase and the arrester unit stays in its conducting state. Thus, arrester units can be stacked—i.e. cascaded in a series configuration—to increase the possible operating voltage of the sensitive circuit.

However, when arrester units are stacked then the spark-over voltage at which the whole arrester stack becomes conducting is also increased. As a result, there may be voltage surges that would not be led to ground and could harm the sensitive circuits.

In order to keep the activation voltage of the stack of surge arrester low, each stage of the surge arrester, i.e. each individual arrester unit, can be electrically connected to the input terminal of the surge arrester via a capacitor.

The resistivity of the capacitor depends on the current's spectral components: $I=I(t)$. The resistivity is infinite for a direct (DC) current and decreases to finite resistivity with increasing frequencies. As voltage surges comprise high-frequency properties, a capacitor becomes conducting.

The capacitors and the arrester units can be connected via soldered contacts. However, due to different heat capacitances during soldering steps, assembling the surge arrester together with the capacitor can be problematic.

It is, thus, an object of the present invention to provide a surge arrester which is easy to assemble. It is another object of the invention to provide surge arresters having reduced maintenance costs. It is a further object to provide a method for manufacturing such a surge arrester.

Therefore, a surge arrester and a method for manufacturing a surge arrester according to the independent claims are provided. Dependent claims relate to preferred embodiments of the invention.

In one embodiment, a surge arrester comprises a first terminal, a first node, and a second terminal. The surge arrester further comprises two arrester units: an input stacked arrester unit and a first arrester unit. These arrester units are cascaded forming a stacked arrester. The surge arrester further comprises a first capacitor, and a first resilient element. The first node is arranged between the first terminal and the second terminal. The first node can be electrically connected between the input arrester unit and the first arrester unit. The input arrester unit is electrically connected between the first terminal and the first node. The first arrester unit is electrically connected between the first node and the second terminal. The first capacitor is electrically connected between the first terminal and the first node. The resilient element establishes a mechanical and an electrical connection between the first capacitor and the first node.

Thus, a surge arrester is provided that can conduct current surges from the first terminal to the second terminal. The first terminal can be electrically connected to a sensitive circuit and the second terminal can be electrically connected to ground. For DC currents, the resistivity of the capacitor is infinite and the activation voltage of the surge arrester—i.e. the voltage at which the surge arrester becomes conducting—is approximately twice the activation voltage of a single arrester unit.

An arrester unit can comprise a hollow body that is filled with a gas, e.g. a noble gas. The hollow body can comprise a ceramic material.

The first and the second terminal can comprise means for mechanically connecting the surge arrester on a circuit board of an external circuit.

However, the resistivity of the capacitor becomes low at high frequencies starting the first arrestor unit which is, thus, electrically connected in parallel with respect to the input arrester unit. Thus, the activating voltage for current surges is not increased compared to surge arresters comprising one arrester unit only.

As the resilient element establishes the electrical connection between the first capacitor and the first node, the assembly of the surge arrester is simplified as no soldered contacts are needed.

Another advantage of such a surge arrester is the fact that the capacitor can easily be separated from the node without the need for opening a soldered connection. If, for example, the stack or the capacitor has to be replaced, then the capacitor can easily be detached. Either the capacitor can be reconnected to a new stack or the stack can be reconnected to a new capacitor. Thus, maintenance of the surge arrester is improved and maintenance costs are reduced.

In one embodiment, the surge arrester further comprises a first and a second connection element and a circuit board having a first side. The stacked arrester units are arranged between the connection elements for connecting the surge arrester with an external circuit. The connection elements are electrically connected to the first and the second terminal, respectively. The circuit board is arranged between the connection elements. The first capacitor is arranged on the first side of the circuit board. The first resilient element is a metal clip mechanically connecting the circuit board with the first node.

Thus, the two connection elements can hold the stack in a fixed position relative to the circuit board. This makes it easy for a metal clip to be arranged between the stack and the board in such a way that a force is exerted onto the node of the arrester stack. The two connection elements can comprise a rod-shaped distal end each for mechanically and electrically connecting the surge arrester to an external circuit.

In one embodiment, the surge arrester comprises the input arrester unit, n arrester units, n resilient elements, n nodes, and n capacitors. Thus, a n+1 staged surge arrester is provided because the input arrester unit is stacked together with the n further arrester units. In the n-th stack, the n-th resilient element establishes a mechanical and electrical connection between the n-th capacitor and the n-th node. n can be an integer number such as 1, 2, 3, 4, 5, . . . . The input arrester establishes stage 0.

In one embodiment, each arrester unit comprises a gas filled surge arrester. Each resilient element comprises a U-shaped distal end for a mechanical connection between the circuit board and the respective node, and a lever for exerting a force onto the respective node.

In one embodiment, a surge arrester comprises a fuse being arranged on circuit board's first side and being electrically connected between the first terminal and the capacitors. With respect to the fuse or to the first terminal, the capacitors are electrically connected in parallel.

Thus, one fuse is sufficient to protect the plurality of capacitors of the stacked surge arrester.

In one variant, the sure arrester comprises a conductor instead of the fuse.

In one embodiment, the capacitors can be SMD (Surface Mounted Device)-capacitors. Further, the surge arrester can comprise a SMD fuse.

In one embodiment, the surge arrester's capacitors have a capacity between 50 pF and 150 pF, e.g. 100 pF, each. Further, each stacked arrester unit has an arc voltage between 10 V and 30 V, e.g. 16 V.

In one embodiment, the surge arrester further comprises electrodes between the arrester units having a flat side. The flat side establishes a good mechanical, and thus electrical, contact with the respective resilient element.

In one embodiment the electrical and/or mechanical connection between the connection elements and the arrester units are established via a braze welding method, e.g. at 800° C. Such a high temperature—compared to conventional soldering methods—provides an improved resistivity against failure when conducting high power surges.

The connection elements can be braze weldable to an external circuit board.

A method for manufacturing a surge arrester may comprise the following steps
  providing a stack of arrester units, the stack comprising a node between the arrester units,
  providing a capacitor on a circuit board,
  electrically and mechanically connecting the circuit board with the node via a resilient element.

Examples of surge arresters are shown in the figures.
Short description of the drawings.
FIG. 1 shows an equivalent circuit diagram of a surge arrester comprising two stacked arrester units.
FIG. 2 shows an equivalent circuit diagram of a surge arrester comprising three stacked arrester units.
FIG. 3 shows stage i of an n-staged surge arrester.
FIG. 4 shows a perspective view of a surge arrester with five stacked arrester units.
FIG. 5 shows another perspective view on a surge arrester with a more specific view onto the resilient element.
FIG. 6 shows a possible embodiment of a resilient element.
FIG. 7A shows a perspective view of a circuit board.
FIG. 7B shows a perspective view of a circuit board carrying a fuse, a capacitor, and a resilient element.
FIG. 7C shows another perspective view of the circuit board of FIG. 7B.
FIG. 8 shows a perspective view of stacked arrester units being arranged between two connection elements.
FIG. 9 shows a more detailed perspective view of a connection element.
FIG. 10 shows a perspective view of a circuit board carrying four capacitors, four resilient elements, and one fuse.
FIG. 11 shows a perspective view of a surge arrester comprising two connection elements and a circuit board with four capacitors and four resilient elements and one fuse.
FIG. 12 shows a circuit board in a vertical position assembled with four contact elements and four contact springs.
FIG. 13 shows connection elements having holding elements for holding a circuit board in a vertical position.
FIG. 14 shows a surge arrester comprising the holding elements of FIG. 13 and the vertical circuit board of FIG. 12.

DETAILED DESCRIPTION

FIG. 1 shows an equivalent circuit diagram of a surge arrester SAR. The stacked surge arrester SAR comprises two arrester units AU0, AU1. The arrester units AU0, AU1 are electrically connected in series between a first terminal T1 and a second terminal T2. The first terminal T1 could be electrically connected to a sensitive external circuit, the second terminal T2 could be electrically connected to ground, or vice versa. The surge arrester SAR comprises a first node N1 electrically connected between the two stacked arrester units. A surge arrester stage AS comprises the first arrester unit AU1, the first node N1, the first resilient element RE1, and the first capacitor CA1. The first capacitor CA1 is electrically connected between the first terminal T1 and the first node N1. It is electrically conductive for AC potentials and isolating for DC potentials. Thus, a voltage surge is applied to both sides of the arrestor unit AU0 while a DC voltage is applied to both arrester units AU0, AU1 which are connected in series.

When a surge arrester SAR is activated by a voltage surge, then the potential of the surge is conducted via the first capacitor CA1. The mechanical connection between the first capacitor CA1 and the first node N1 is established by means of the resilient element.

FIG. 2 shows an equivalent circuit diagram of a multi-staged arrestor. The number of stages can easily be increased by electrically connecting stages AS1, AS2, . . . in series.

FIG. 3 shows stage number i ASi of an n-th stage surge arrester. The stage i comprises an arrester unit AUi, a node Ni, a resilient element REi, and a capacitor CAi. Here, i is a natural number $1 \leq i \leq n$.

FIG. 4 shows a perspective view of a surge arrester SAR comprising a first terminal T1 and a second terminal T2. A stack of arrester units AU0, AU1, . . . , and respective nodes N1, N3 are arranged between the two terminals T1, T2. In this embodiment, the nodes are established by electrodes EL. Thus, electrodes EL electrically connect and physically separate the respective arrester units AUi. Further, electrodes EL electrically connect the stack with the first terminal T1 and the second terminal T2. A surge arrester SAR, thus, may comprise n+1 stacked arrester units.

The surge arrester SAR further comprises a circuit board CB. Metallization structures ME are arranged on the circuit board CB. The surge arrester of FIG. 4 comprises a first capacitor CA1 being arranged on the circuit board CB. One side of the first capacitor CA1 is electrically connected to the first terminal T1 via a fuse FU and to the first node N1. For that, a first resilient element RE1 electrically connects the other side of the capacitor CA1 with the first node N1. Therefore, each side of capacitor CA1 is attached to the metallization ME on the surface of the circuit board CB. The resilient element RE is mechanically connected to the respective metallization structure ME and to the node N1, established by an electrode between the stacked arrester units. For simplicity's sake, FIG. 4 shows a surge arrester comprising only one capacitor CA1 and only one resilient element RE1. The metallization structures ME on the circuit board CB, however, clearly indicate that the respective capacitors CA1, . . . , CAn could be attached to the circuit board and electrically connected in parallel via a Fuse FU with the first terminal T1.

A completely assembled circuit board can be seen in FIG. 10 and a completely assembled surge arrester can be seen in FIG. 11.

FIG. 5 shows another perspective view of the surge arrester SAR of FIG. 4. The first resilient element RE1 is established by a clip which is attached to the circuit board CB on one end and which comprises a lever that exerts a force on node N1.

The first terminal T1 and the second terminal T2 are established by respective first CE1 and second CE2 connection elements. With these connection elements CE1, CE2, the surge arrester SAR can be connected electrically and mechanically to an external circuit. These connection elements may comprise a metal, e.g. copper.

The electrodes EL establishing the nodes between the arrester units AUi can comprise a flat side arranged towards the circuit board CB. The resilient Element REi when realized by a metal clip can easily be attached to and detached from the arrester. Accordingly, the stack of arrester units or the circuit board can be replaced without effort. Thus, assembly and maintenance costs and costs for spare elements of such arresters are reduced.

FIG. 6 shows an embodiment of the resilient element RE. The resilient element RE is realized as a clip CL which comprises a U-shaped distal end U which can easily be attached to and detached from a circuit board. Further, the resilient element RE comprises a lever LE with a bent structure BS at its other distal end. This distal end of the lever LE can exert a force onto the stack's nodes or electrodes.

FIG. 7A shows a perspective view of a circuit board CB with the metallization structure ME and without any capacitor assembled.

FIG. 7B shows an embodiment of a circuit board CB carrying a capacitor CA1 and fuse FU to establish an electrical connection between the capacitor CA1 and the first terminal.

The resilient element is attached to the circuit board by clipping its U-shaped distal end to the metalized structure ME. In addition, the U-shaped distal end can be soldered to the metallization.

FIG. 7C shows the circuit board of FIG. 7B from another perspective view indicating lever LE for a mechanical and electrical connection to its respective node of the stack.

The circuit board CB can comprise a recess REC on each of its distal ends.

FIG. 8 shows how the stacked surge arrester units are arranged between the terminals or the connection elements, respectively. For simplicity's sake the circuit board is omitted.

FIG. 9 shows a more detailed perspective view of a terminal T1, T2 being realized by a connection element C1, C2. It comprises a hole HO and a groove GRV. Within the groove GRV, a protrusion PR is arranged. When assembling a surge arrester, the distal end of a circuit board CB is attached to the groove GRV of the respective connecting element C1, C2. Then, the protrusion PR is arranged in the recess REC of the circuit board CB.

Figure 1:
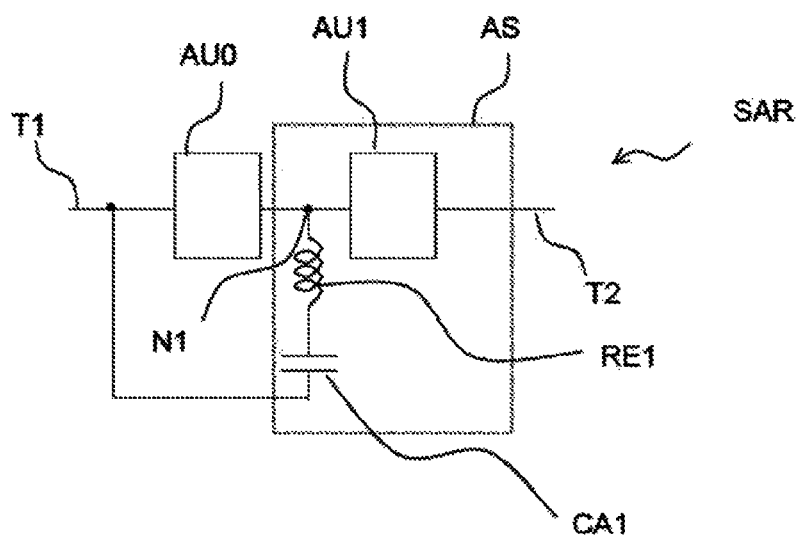
Figure 2:
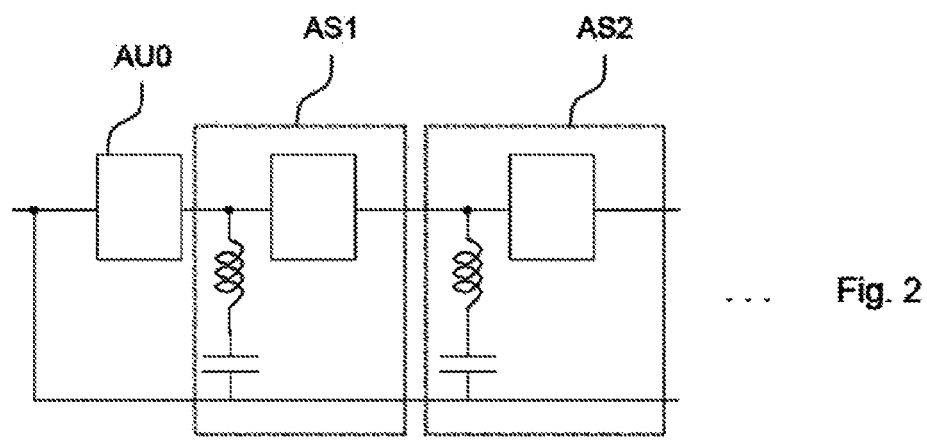
Figure 3:
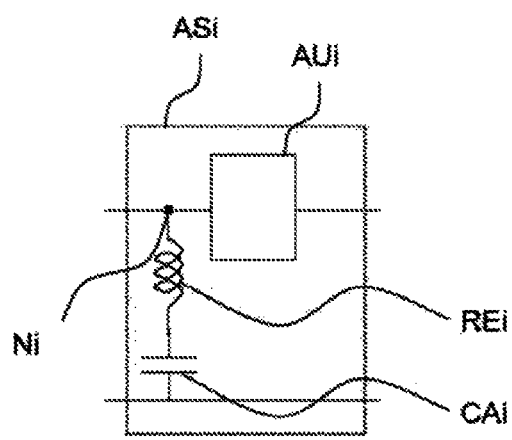
Figure 10:
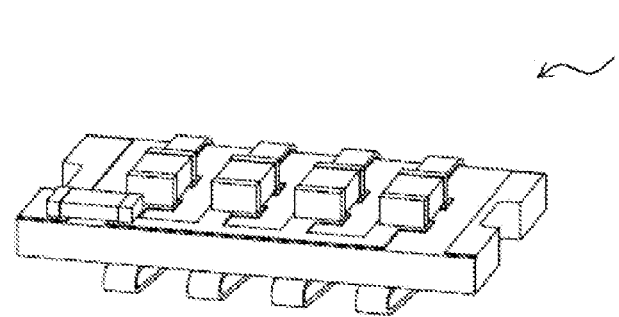

FIG. 10 shows a circuit board CB carrying four capacitors. For each capacitor, a clip as a resilient element is attached to the circuit board CB.

Figure 11:
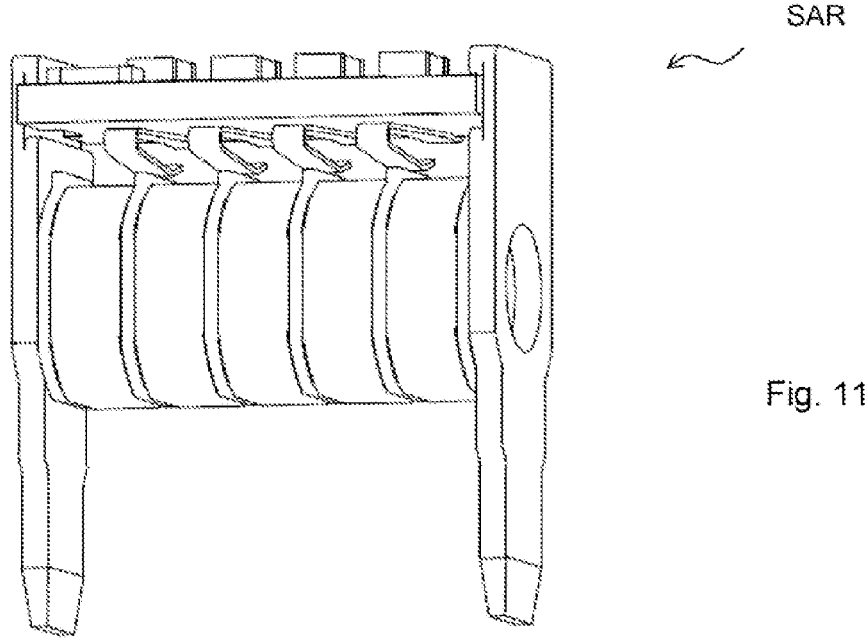

FIG. 11 shows a surge arrester comprising the circuit board of FIG. 10. It can be seen that each of the four clips electrically and mechanically connect the circuit board carrying respective metallization structures with the respective nodes of the stacked arrester units being established by electrodes.

As the resilient elements exert a force onto the electrodes of the arrester stack, the circuit board itself is pushed away from the stack. Thus, the connections elements' protrusions PR shown in FIG. 9 extend into the circuit board's recesses REC.

physically stabilizing the arrester. As the length of the protrusions is shorter than the width of the connection elements' grooves, the circuit board CB is, although physically attached, easily removable.

FIG. 12 shows a circuit board in a vertical position.

FIG. 13 shows connection elements CE1, CE2 having holding elements HE1, HE2 for holding a circuit board in a vertical position.

FIG. 14 shows a surge arrester comprising the holding elements of FIG. 13 and the vertical circuit board of FIG. 12. It can be seen that the protrusions of the holding elements of the connection elements extend into the circuit boards recesses. The distal ends of the circuit board extend into the grooves of the holding elements.

A configuration with a vertical circuit board next to the stack of arrester units according to FIG. 14 may—in contrast to the embodiment of a horizontal circuit board as shown in FIG. 11—be advantageous because the resulting height of the arrester is reduced. Of course every orientation of the circuit board with respect to the stack or to the distal ends of the connection elements is possible.

The electrodes between the stacked arrester units can comprise a metal such as copper. A surge arrester comprising five arrester units can have a length of approximately 4 cm. Each arrester unit can have a stacked height of approximately 11 mm. The capacitors can be SMD capacitors which can sustain the high voltages of discharge surges. The capacitors can have a capacity of 100 pF each. The weight of a respective surge arrester can be between 5 and 6 g. The operation and storage temperature can be between −40 and +90° C. Current surges of 100 A to 20 kA can be conducted. The arc voltage of the surge arrester can exceed, for instance, 60 V. Other values are also possible A surge arrester is not limited to the embodiments described in the specification or shown in the figures. Surge arresters comprising further elements such as fuses, capacitors, metallizations, connection elements, circuit boards, electrodes or stacked arrester units or further active or passive circuit components are also comprised by the present invention.

LIST OF REFERENCE SIGNS

BS: bent structure
CA1, CAi: capacitor
CB: circuit board
CE1, CE2: first, second connection element
FS: flat surface
FU: fuse
GRV: groove
HE1, HE2: first, second holding element
HO: hole
LE: lever of a resilient element
ME: metallization
N1, N2, . . . , Ni: first, second, . . . , i-th node
PR: protrusion
RE1, REi: resilient element
REC: recess
SAR: surge arrester
AS0, AS1, ASi: surge arrester stage
AU0, AU1, AUi: stacked arrester unit
T1, T2: first, second terminal
U: U-shaped distal end of a resilient element

The invention claimed is:

1. A surge arrester (SAR), comprising
a first terminal (T1), a first node (N1) and a second terminal (T2),
an input arrester unit (AU0) and a first arrester unit (AU1), a first capacitor (CA1), and a first resilient element (RE1),
a first connection element (CE1), a second connection element (CE2) for connecting the surge arrester with an external circuit and a circuit board (CB) having a first side, where
the first node (N1) is arranged between the first terminal (T1) and the second terminal (T2),
the input arrester unit (AU0) is electrically connected between the first terminal (T1) and the first node (N1),
the first arrester unit (AU1) is electrically connected between the first node (N1) and the second terminal (N2),
the first capacitor (CA1) is electrically connected between the first terminal (T1) and the first node (N1),
the first resilient element (RE1) establishes a mechanical and an electrical connection between the first capacitor (CA1) and the first node (N1), where
the arrester units (AU0, AU1) are arranged between the connection elements (CE1, CE2),
the connection elements (CE1, CE2) are electrically connected to the first (T1) and second (T2) terminal respectively,
the circuit board (CB) is arranged between the connection elements (CE1, CE2),
the first capacitor (CA1) is arranged on the first side of the circuit board (CB),
the first resilient element (RE1) is a metal clip (CL) mechanically connecting the circuit board (CB) with the first node (N1).

2. The surge arrester of claim 1, comprising
the input arrester unit (AU0), n arrester units (AU1, SAU2, . . . ), n capacitors (CA1, CA2, . . . ), n Nodes (N1, N2, . . . ) and n resilient elements (RE1, RE2, . . . ), where
in the n-th stage the n-th resilient element (REn) establishes a mechanical and electrical connection between the n-th capacitor (CAn) and the n-th node (Nn), and
n=2, 3, 4, 5, or more.

3. The surge arrester of claim 2, where
each arrester unit (AU0, AU1, . . . ) comprises a gas filled surge arrester,
each resilient element (RE1, RE2, . . . ) comprises a U-shaped distal end (U) for a mechanical connection between the circuit board (CB) and the respective node (N1, N2, . . . ), and a lever (LE) for exerting a force onto the respective node (N1, N2, . . . ).

4. The surge arrester of claim 3, comprising a fuse (FU) being arranged on the first side of the circuit board (CB) and being electrically connected between the first terminal (TE) and the capacitors (CA1, CA2, . . . ).

5. The surge arrester of claim 3, comprising a conductor being arranged on the first side of the circuit board (CB) and being electrically connected between the first terminal (TE) and the capacitors (CA1, CA2, . . . ).

6. The surge arrester of claim 5, where the capacitors (CA1, CA2, . . . ) are SMD-capacitors.

7. The surge arrester of claim 6, where
each capacitor (CA1, CA2, . . . ) has a capacity between 50 and 150 pF and
each stacked arrester unit has an arc voltage between 10 and 30 V.

8. The surge arrester of claim 1, further comprising
electrodes (EL) between the arrester units (AU0, AU1, . . . ), where
the electrodes (EL) have a flat side (FS) for contacting the resilient element (RE1).

9. The surge arrester of claim 1, where
the first terminal and second terminal are braze welded to the respective arrester units, and
the connection elements are braze weldable to an external circuit board.

10. A method for manufacturing the surge arrester (SAR) of claim 1, comprising the steps
providing a stack of arrester units (AU0, AU1), the stack comprising a node (N1) between the arrester units (AU0, AU1),
providing a capacitor (CA1) on a circuit board (CB),
electrically and mechanically connecting the circuit board (CB) with the node (N1) via a resilient element (RE1).

* * * * *